Patented Feb. 9, 1926.

1,572,388

UNITED STATES PATENT OFFICE.

HARRY HEY, OF MELBOURNE, VICTORIA, AUSTRALIA.

RECOVERY OF LEAD AND SILVER FROM SULPHIDE ORES AND METALLURGICAL PRODUCTS.

No Drawing. Application filed January 20, 1921. Serial No. 438,775.

*To all whom it may concern:*

Be it known that I, HARRY HEY, a subject of the King of Great Britain, residing at Collins House, 360–366 Collins Street, Melbourne, in the State of Victoria, Commonwealth of Australia, have invented certain new and useful Improvements in the Recovery of Lead and Silver from Sulphide Ores and Metallurgical Products, of which the following is a specification.

This invention relates to the recovery of lead and silver from sulphide ores and metallurgical products and refers more particularly to sulphide ores containing lead and silver and zinc (such as the Broken Hill ores).

The invention is applicable to the treatment of concentrates, slimes, tailings and other metallurgical products as well as crude ores and it is to be understood that in this specification the term "ores" will include such products.

It has been proposed to treat ores of this description by effecting a preferential chloridization of the lead and silver and to subsequently leach out the metallic chlorides so formed. One method for effecting this result is to mix the ore with an amount of zinc chloride in excess of that required for the chloridization of the lead and silver sulphide in the ore and to heat the admixture in a closed furnace without access of air to bring about the chloridizing reactions. The lead and silver chlorides are then leached out usually with hot brine solution precautions being taken to prevent the reaction between the metal sulphides contained in the product and the metal chloride so formed. Another method proposed for the treatment of ores of this description is to heat the ores with a sufficient quantity of strong hydrochloric acid solution at a temperature of 100° C. subsequently leaching out the lead chloride with hot water or strong brine. According to this method however the extraction of both the lead and silver is not effected.

The object of this invention is to provide certain improvements in the chloridizing treatment of sulphide ores whereby preferential chloridization of the lead and silver is effected in a more economical and efficient manner and the use of metal chloride such as zinc chloride obviated.

We accomplish this object by heating the ore in a closed furnace without access of air in the presence of gaseous hydrochloric acid whereby the preferential chloridization of both the lead and the silver is effected.

According to this invention the ore is heated without access of air in a closed furnace or retort through which a current of gaseous hydrochloric acid is caused to pass under such conditions that oxidation is substantially avoided. During this heating operation intimate contact between the particles of ore and the chloridizing gas is ensured by the use of suitable agitators or stirrers which may also have the effect of progressively moving the ore through the furnace or retort or the chloridizing gas may be drawn or forced through a bed or layer of ore whilst being heated or the ore may be projected or dropped through an atmosphere of the chloridizing gas under such conditions that the required temperature is maintained.

From a series of experiments which have been conducted by us it has been demonstrated that a range of temperature for this heating operation of from 450° C. to 600° C. will give efficient results but it will be understood that we do not confine ourselves to this range of temperature. We have found that when heating at a lower temperature than 450° C. substantial chloridizing of the lead and silver can be obtained and also that when heating at a higher temperature than 600° C. almost complete chloridizing can be effected but for practical purposes we believe that a range of temperature from 450° C. to 600° C. will suffice.

After being subjected to this heating operation in the presence of gaseous hydrochloric acid for the requisite period it is found that a preferential chloridization of the lead and silver has been effected and these chlorides may be removed by leaching or otherwise leaving a residue substantially free from lead and silver. The removal of the lead and silver chlorides may be either separately or together by the use of well known solvents.

In carrying out this invention the gaseous hydrochloric acid may be generated in situ, the heating operation however being carried out under the same conditions as before mentioned.

The following example will illustrate one application of this invention.

A sample of Broken Hill zinc concentrates assaying 7.85% lead, 48% zinc, and 0.25% copper and 8.8 ozs. of silver was charged into a closed furnace or retort and heated at 450° C. and continuously rabbled or stirred whilst gaseous hydrochloric acid was passed through the said furnace or retort for a period of 60 minutes. A sample of the chloridized product was then leached with known solvents for the lead and silver chlorides leaving a residue containing .07% of lead and 0.4 ozs. of silver per ton.

It has been demonstrated that the preferential chloridizing of the lead and silver is effected by the gaseous hydrochloric acid and not through the medium of zinc chloride formed in situ inasmuch as with an excess of hyrdochloric acid there was no additional reaction upon the zinc sulphide present with the formation of zinc chloride.

The temperature conditions necessary to effect the chloridization of the lead and silver cannot be definitely stated without reference to the class of ore treated but these conditions can be determined by taking separate samples of the ore in a relatively fine state of division and heating the same in a tube through which hydrochloric acid gas is caused to pass at different temperatures. The different products are then leached with suitable solvents (such as hot brine) to dissolve the chlorides of silver and lead when an assay of the residues will indicate the temperatures at which preferential chloridization has been effective and of these temperatures the lowest will obviously be advantageously employed under commercial conditions. By the expression "preferential" chloridizing as used in this specification and appended claims I mean a substantial chloridizing of the lead and silver contained in the ore while substantially inhibiting the chloridization of other metallic values contained in the ore.

By the expression "non-oxidizing" conditions as used in this specification and appended claims it is to be understood that I intend such conditions as will substantially inhibit the union of oxygen with any other materials under treatment.

I claim:

1. In the recovery of lead and silver from sulphide ores, subjecting the ore to a heating operation in the presence of gaseous hydrochloric acid under substantially non-oxidizing conditions to effect the preferential chloridizing of the lead and silver present while substantially inhibiting the chloridization of other sulphides contained in the ore, and then leaching out the chlorides of lead and silver with suitable solvents leaving a residue substantially free from lead and silver.

2. In the recovery of lead and silver from sulphide ores heating the ore in the presence of gaseous hydrochloric acid at a temperature substantially above 100° C. and preferably within a range of from 450° C. to 600° C. under such conditions that oxidation is substantially avoided to effect the preferential chloridizing of the lead and silver present.

3. In the recovery of lead and silver from sulphide ores heating the ore in the presence of gaseous hydrochloric acid at a temperature substantially above 100° C. (and preferably within a range of from 450° C. to 600° C.) under such conditions that oxidation is substantially avoided and subjecting the same to stirring or agitation during such heating operation to effect the preferential chloridizing of the lead and silver present.

4. In the recovery of lead and silver from sulphide ores heating the ore in the presence of gaseous hydrochloric acid at a temperature substantially above 100° C. (and preferably within a range of from 450° C. to 600° C.) under substantially non-oxidizing conditions and subjecting the same to stirring or agitation during such heating operation to effect the preferential chloridizing of the lead and silver present and then leaching out the chlorides of lead and silver with suitable solvents leaving a residue substantially free from lead and silver substantially as described.

In testimony whereof I have signed my name to this specification.

HARRY HEY.